United States Patent
Eto

(10) Patent No.: US 8,081,014 B2
(45) Date of Patent: Dec. 20, 2011

(54) APPARATUS FOR DETECTING PRESENCE OR ABSENCE OF OSCILLATION OF CLOCK SIGNAL

(75) Inventor: Kimiharu Eto, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 0 days.

(21) Appl. No.: 13/168,149

(22) Filed: Jun. 24, 2011

(65) Prior Publication Data

US 2011/0258476 A1    Oct. 20, 2011

Related U.S. Application Data

(63) Continuation of application No. 12/966,367, filed on Dec. 13, 2010, now Pat. No. 7,986,168, which is a continuation of application No. 12/320,576, filed on Jan. 29, 2009, now Pat. No. 7,872,505.

(30) Foreign Application Priority Data

Nov. 27, 2008    (JP) .................................. 2008-302751

(51) Int. Cl.
G01R 19/00    (2006.01)
(52) U.S. Cl. .......................................... 327/18; 327/20
(58) Field of Classification Search .................. None
See application file for complete search history.

(56) References Cited

U.S. PATENT DOCUMENTS

| | | | |
|---|---|---|---|
| 4,618,850 A | | 10/1986 | Lenhoff, Jr. |
| 4,672,325 A | * | 6/1987 | Murai ........................... 327/135 |
| 5,195,049 A | | 3/1993 | Kontani et al. |
| 5,737,588 A | | 4/1998 | Maeda et al. |
| 6,707,320 B2 | * | 3/2004 | Trivedi et al. ................... 327/20 |
| 7,352,214 B2 | * | 4/2008 | Evans et al. ..................... 327/18 |
| 7,714,619 B2 | | 5/2010 | Yamada |
| 2003/0226054 A1 | | 12/2003 | Benno et al. |
| 2008/0263073 A1 | | 10/2008 | Ohba et al. |

FOREIGN PATENT DOCUMENTS

| | | |
|---|---|---|
| JP | 04-365110 | 12/1992 |
| JP | 2004-334794 A | 11/2004 |

* cited by examiner

*Primary Examiner* — Cassandra Cox
(74) *Attorney, Agent, or Firm* — Foley & Lardner LLP

(57) ABSTRACT

A semiconductor apparatus includes an arithmetic circuit that executes a program based on an operating clock signal input through a clock transfer node, an internal oscillator that generates an internal clock signal to be used internally, a watch dog timer that counts the internal clock signal, detect that a count value reaches a predetermined value of an execution time of the program in the arithmetic circuit and output a notification signal, and a clock monitor circuit that detects presence or absence of the operating clock signal in response to the notification signal.

11 Claims, 6 Drawing Sheets

APPARATUS FOR DETECTING PRESENCE OR ABSENCE OF OSCILLATION OF CLOCK SIGNAL

CROSS-REFERENCE TO RELATED PATENT APPLICATIONS

This application is a continuation of application Ser. No. 12/966,367, filed Dec. 13, 2010, now pending, which is a continuation of application Ser. No. 12/320,576, filed Jan. 29, 2009, now U.S. Pat. No. 7,872,505, issued Jan. 18, 2011, which claims the benefit of priority from the prior Japanese Patent Application No. 2008-302751, filed Nov. 27, 2008, the entire contents of which are incorporated herein by reference. This application claims only subject matter disclosed in the parent application and therefore presents no new matter.

BACKGROUND OF THE INVENTION

1. Field of the Invention

The present invention relates to a semiconductor apparatus and an anomaly detection method of the same, and, particularly, to a semiconductor apparatus including an arithmetic circuit to execute a program and an anomaly detection method of the same.

2. Description of Related Art

A semiconductor apparatus such as a microcomputer operates based on an operating clock signal that is generated externally. The operating clock signal to be supplied to the microcomputer may be switched for the purpose of reducing the power consumption of a system including the microcomputer or improving the reliability of the microcomputer.

One example of switching the operating clock signal is disclosed in Japanese Unexamined Patent Application Publication No. 4-365110. FIG. 5 is a block diagram showing a semiconductor apparatus 100 disclosed in Japanese Unexamined Patent Application Publication No. 4-365110. The semiconductor apparatus 100 is a clock stop circuit. The semiconductor apparatus 100 includes a clock stop detector 101, a set-reset flip-flop 102, a free-running multivibrator 103, a counter 104, and a selector 105. In the semiconductor apparatus 100, the presence or absence of an external clock signal CKE is detected by the clock stop detector 101. If the stopped state of the external clock signal CKE is detected by the clock stop detector 101, an internal clock signal CKI that is generated by an internal clock generator composed of the set-reset flip-flop 102 and the free-running multivibrator 103 is output as a clock signal CLK to an internal circuit such as a microcomputer during a prescribed period set by the counter 104. The selector 105 selects which of the external clock signal CKE and the internal clock signal CKI is output as the clock signal CLK.

Specifically, in the case where the oscillation of the external clock signal CKE is stopped in order to reduce the power consumption of the system, the semiconductor apparatus 100 operates using the internal clock generator during a prescribed period from the stop of the external clock signal CKE. Therefore, even when the external clock signal CKE is stopped irrespectively of the operation of the microcomputer, the microcomputer can be shifted to the stopped state safely by the internal clock signal CKI in the semiconductor apparatus 100. The semiconductor apparatus 100 thus allows the external clock signal CKE to be stopped irrespectively of the operation of the microcomputer in the case of stopping the external clock signal CKE in order to reduce the power consumption of the system including the microcomputer.

Another example of switching the operating clock signal is disclosed in Japanese Unexamined Patent Application Publication No. 2004-334794. FIG. 6 is a block diagram showing a semiconductor apparatus 200 disclosed in Japanese Unexamined Patent Application Publication No. 2004-334794. The semiconductor apparatus 200 is a phase-locked loop (PLL) and an oscillation stop detector in a microcomputer with a built-in PLL. The semiconductor apparatus 200 further includes an externally generated clock stop circuit to receive an externally generated clock in the previous stage of the PLL and the oscillation stop detector, although not shown in FIG. 6.

Referring to FIG. 6, the semiconductor apparatus 200 includes a PLL 210 and an oscillation stop detector 201. The oscillation stop detector 201 includes an edge detector 220, a 2-bit counter 230, an OR circuit 240, and an externally generated clock signal stop detector 250. If an externally generated clock signal is supplied, the PLL 210 outputs an internal clock signal SCLK having a frequency of n-times multiplication of the externally generated clock signal. If, on the other hand, a low level voltage (e.g. a ground voltage), not an externally generated clock signal, is supplied, the PLL 210 outputs an internal clock signal SCLK having a prescribed frequency. The edge detector 220 detects the edge of the externally generated clock signal. The 2-bit counter 230 is cleared by an output of the edge detector 220 and performs count operation using the internal clock signal as a count source. A clear signal to the 2-bit counter 230 is input through the OR circuit 240. An initialization signal INITIAL and an output signal of the edge detector 220 are input to the OR circuit 240. Thus, the clear signal to the 2-bit counter 230 is a result of a logical OR operation between the initialization signal INITIAL and the output signal of the edge detector 220. If an output of the 2-bit counter 230 exceeds a prescribed set value, the externally generated clock signal stop detector 250 detects it as the stop of the externally generated clock signal and keeps outputting an external clock stop detection signal CT11. Then, if the externally generated clock stop circuit receives the external clock stop detection signal CT11, it blocks the externally generated clock signal and outputs a low level signal.

In this manner, in the semiconductor apparatus 200, when an externally generated clock signal is stopped due to a defect such as a break, the stop of the externally generated clock signal is detected by the oscillation stop detector 201, and the internal clock signal SCLK generated by the PLL 210 is used as an operating clock signal after that. It is thereby possible for the semiconductor apparatus 200 to maintain the operation of the microcomputer or the like even if the stop of the externally generated clock signal occurs due to a break or the like. Therefore, the semiconductor apparatus 200 can ensure high reliability against a defect in the externally generated clock signal.

SUMMARY OF THE INVENTION

However, the present inventors have found the following problems. According to the techniques disclosed in Japanese Unexamined Patent Application Publications Nos. 4-365110 and 2004-334794, it is necessary to constantly monitor the oscillation state of the external clock signal, thus failing to reduce power consumption during the operation of a semiconductor apparatus.

Further, in a semiconductor apparatus such as a microcomputer, runaway or shutdown of a running program sometimes occurs to cause a serious trouble in a system. One cause of the program runaway or shutdown is the stop of the operating clock. In this circumstance, the use of another clock as a substitute for a stopped external clock according to the technique disclosed in Japanese Unexamined Patent Application Publication No. 4-365110 or 2004-334794 appears effective.

However, in a semiconductor apparatus such as a microcomputer, when processing of a program does not end after a given length of time, it may be determined that the program is running away or shut down and the program may be forcibly terminated by discarding information about the running program or the like. Therefore, even when the supply of the operating clock signal is restarted using the technique disclosed in Japanese Unexamined Patent Application Publication No. 4-365110 or 2004-334794, if the restart is after the forced termination of the program, the state before the resupply of the operating clock signal is started is discarded already, so that the microcomputer resumes based on the state that is completely different from the previous state. Therefore, the microcomputer after the resumption may not operate normally due to the runaway of the program that has newly occurred.

Specifically, because the techniques disclosed in Japanese Unexamined Patent Application Publications Nos. 4-365110 and 2004-334794 monitor the presence or absence of the oscillation of the external clock signal only, the resupply of the operating clock signal is started regardless of the state of the running program, causing a failure to allow the microcomputer after the resumption to operate normally. For such a reason, the reliability in the operation of the microcomputer is insufficient according to the techniques disclosed in Japanese Unexamined Patent Application Publications Nos. 4-365110 and 2004-334794.

A first exemplary aspect of an embodiment of the present invention is a semiconductor apparatus including an arithmetic circuit that executes a program based on an operating clock signal input through a clock transfer node, an internal oscillator that generates an internal clock signal to be used internally, a watch dog timer that counts the internal clock signal, detect that a count value reaches a predetermined value of an execution time of the program in the arithmetic circuit and output a notification signal, and a clock monitor circuit that detects presence or absence of the operating clock signal in response to the notification signal.

A second exemplary aspect of an embodiment of the present invention is an anomaly detection method in a semiconductor apparatus including an arithmetic circuit to execute a program based on an operating clock signal, the method including measuring an execution time of the program in the arithmetic circuit, detecting presence or absence of the operating clock signal in response to the execution time reaching a preset value, and determining which of an anomaly in the operating clock signal and an anomaly in the program causes an anomaly state in the arithmetic circuit.

In the semiconductor apparatus and the anomaly detection method according to the exemplary aspects of an embodiment of the present invention, the watch dog timer detects the execution state of the program in the arithmetic circuit. If it is determined that an anomaly is occurring in the program, the clock monitor circuit monitors the operating clock signal. Because the clock monitor circuit operates only when there is a possibility of an anomaly in the execution state of the program, it is possible to reduce the power consumption of the semiconductor apparatus.

Further, because the watch dog timer detects the execution state of the program in the arithmetic circuit, and the clock monitor circuit detects an anomaly in the operating clock signal, an operation to be performed for an operation after resumption of the semiconductor apparatus can be determined before the program executed in the arithmetic circuit is forcibly terminated in the semiconductor apparatus according to the exemplary aspect of an embodiment of the present invention. It is thereby possible to improve the reliability at the time of resuming the semiconductor apparatus in the semiconductor apparatus and the anomaly detection method according to the exemplary aspects of an embodiment of the present invention.

According to the exemplary aspects of an embodiment of the present invention described above, it is possible to provide a semiconductor apparatus and an anomaly detection method of the same that ensure lower power consumption and high reliability.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
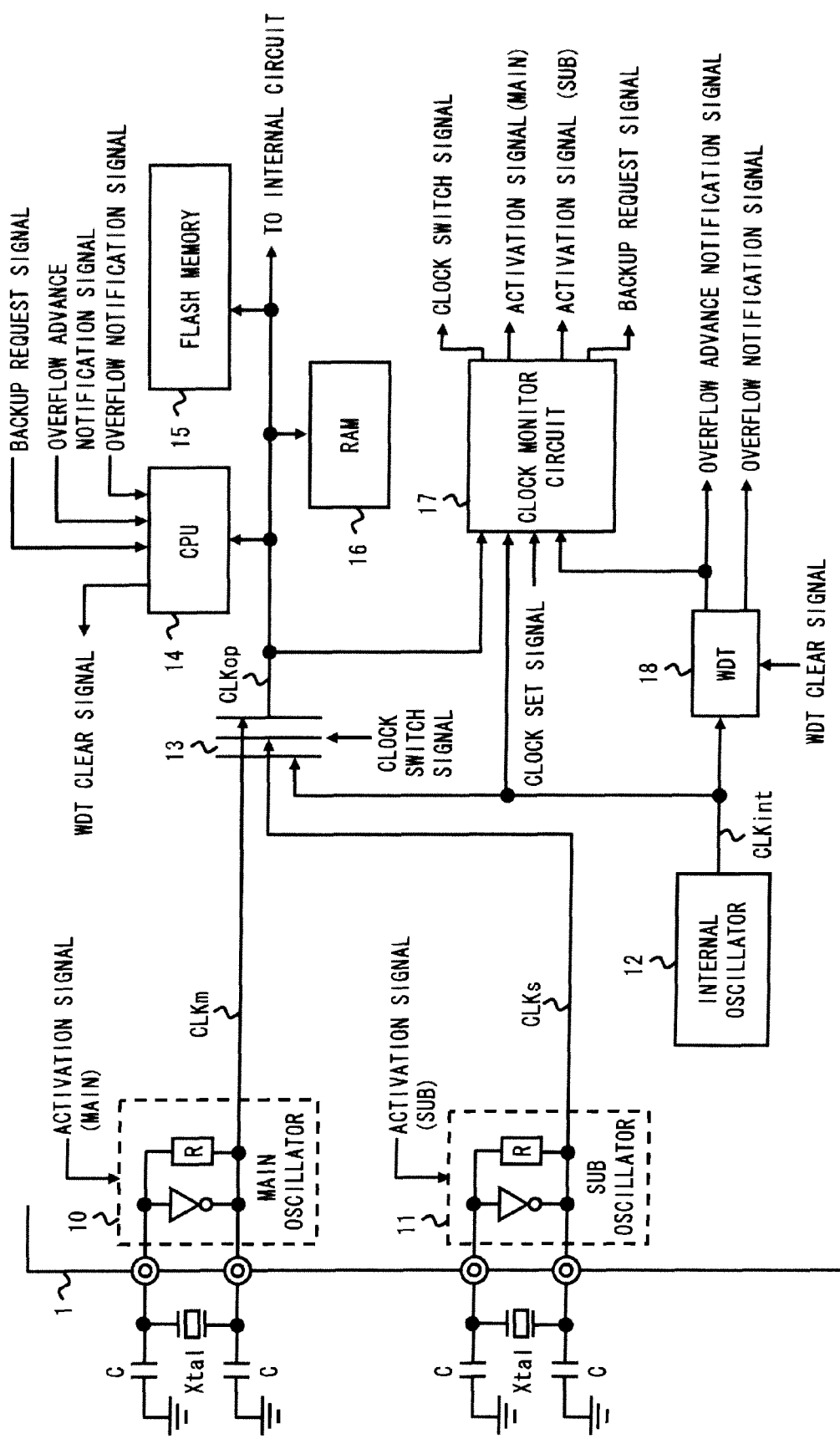
FIG. 1 is a block diagram showing a semiconductor apparatus according to a first exemplary embodiment.

An exemplary embodiment of the present invention is described hereinafter with reference to the drawings. FIG. 1 is a block diagram showing a semiconductor apparatus 1 according to an exemplary embodiment. Referring to FIG. 1, the semiconductor apparatus 1 includes a main oscillator 10, a sub oscillator 11, an internal oscillator 12, a selector 13, an arithmetic circuit (central processing unit (CPU)) 14, a flash memory 15, a random access memory (RAM) 16, a clock monitor circuit 17, and a watch dog timer 18.

The main oscillator 10 and the sub oscillator 11 each include an inverter and a resistor R. The main oscillator 10 and the sub oscillator 11 each constitute an oscillator together with a crystal oscillator Xtal and a capacitor C placed outside the semiconductor apparatus 1. The main oscillator 10 outputs a main clock signal CLKm, and the sub oscillator 11 outputs a sub clock signal CLKs. A time constant that is determined by the resistor R and the capacitor C is different between the main oscillator 10 and the sub oscillator 11, and a different in frequency between the main clock signal CLKm and the sub clock signal CLKs is determined depending on a difference in time constant. In this exemplary embodiment, the main clock signal CLKm has a higher frequency than the sub clock signal CLKs. Although the main clock signal CLKm and the sub clock signal CLKs are generated by the circuit placed inside the semiconductor apparatus 1 and the crystal oscillator Xtal and the capacitor C placed outside the semiconductor apparatus 1 in the exemplary embodiment, the main oscillator 10 and the sub oscillator 11 may be both placed outside. Thus, the main clock signal CLKm and the sub clock signal CLKs are both treated as external clock signals in the following description. Further, the main oscillator 10 and the sub oscillator 11 each switch between an operating state and a stopped state according to an activation signal that is output from the clock monitor circuit 17.

The internal oscillator 12 is an oscillation circuit such as a free running oscillator or a PLL, for example, and it can generate a clock signal by oneself. The internal oscillator 12 generates an internal clock signal CLKint that is used inside the semiconductor apparatus 1.

The selector 13 receives the main clock signal CLKm, the sub clock signal CLKs and the internal clock signal CLKint. The selector 13 then outputs one of the received clock signals based on a clock switch signal that is output from the clock monitor circuit 17. The clock signal that is output from the selector 13 is referred to hereinafter as an operating clock signal CLKop.

The CPU 14 reads a program stored in the flash memory 15 and executes the program. When executing the program, the CPU 14 uses the RAM 16 as a place to store intermediate data that is generated during the execution of the program. The operating clock signal CLKop is supplied to each of the CPU 14, the flash memory 15 and the RAM 16, so that they operate based on the operating clock signal CLKop.

Further, the CPU 14 receives a first notification signal (e.g. an overflow advance notification signal), a second notification signal (e.g. an overflow notification signal) and a backup request signal, and outputs a WDT clear signal. The overflow advance notification signal is supplied from the watch dog timer 18, which is described later. When the CPU 14 receives the overflow advance notification signal, the CPU 14 checks the execution state of the program and outputs the WDT clear signal if the program is running normally. If, on the other hand, the program executed in the CPU 14 runs away or the like, the CPU 14 does not output the WDT clear signal. The WDT clear signal is also output when the program executed in the CPU 14 ends normally and when the program to be executed is switched. The overflow notification signal is also supplied from the watch dog timer 18, which is described later. When the CPU 14 receives the overflow notification signal, the CPU 14 forcibly terminates the program being executed. The backup request signal is supplied from the clock monitor circuit 17, which is described later. When the CPU 14 receives the backup request signal, the CPU 14 saves information related to the program being executed on the RAM 16 or the flash memory 15 in order to ends the executed program in progress.

The clock monitor circuit 17 detects the presence or absence of the operating clock signal CLKop in response to the overflow advance notification signal. Specifically, the clock monitor circuit 17 receives a clock set signal from the CPU 14 or another circuit (not shown) at the start of the semiconductor apparatus 1, so that various settings are made such as a length of a clock monitor period for monitoring the operating clock signal CLKop. Further, the clock monitor circuit 17 operates based on the internal clock signal CLKint. Then, the clock monitor circuit 17 starts monitoring the presence or absence of the operating clock signal CLKop in response to the overflow advance notification signal. The monitoring is performed for a period that is set in advance by the clock set signal.

If the clock monitor circuit 17 detects that the operating clock signal CLKop is stopped, it outputs the clock switch signal so as to switch a clock signal to be selected by the selector into a clock signal different from the currently selected signal. Further, the clock monitor circuit 17 outputs activation signals to the main oscillator 10 and the sub oscillator 11. In this exemplary embodiment, the activation signal for the main oscillator 10 and the activation signal for the sub oscillator 11 are controlled exclusively with each other. Thus, in this exemplary embodiment, the oscillator that is operating at a certain point is either one of the main oscillator 10 or the sub oscillator 11. Further, if the clock monitor circuit 17 detects that the operating clock signal CLKop is stopped, it outputs the backup request signal to the CPU 14. On the other hand, if the clock monitor circuit 17 detects that there is the operating clock signal CLKop during the clock monitor period to monitor the presence or absence of the operating clock signal CLKop, it maintains the clock switch signal, the activation signals and the backup request signal in the same state.

The watch dog timer 18 counts the number the internal clock signals CLKint and, when a count value reaches a preset value, it outputs the overflow advance notification signal or the overflow notification signal. Specifically, the watch dog timer 18 according to the exemplary embodiment has a maximum count value of a time when one program occupies the CPU 14 (which is referred to hereinafter as a program execution time) and an advance notification count value having a smaller value than the maximum value as preset values. When the count value reaches the advance notification count value, the watch dog timer 18 outputs the overflow advance notification signal. Further, when the count value reaches the maximum count value, the watch dog timer 18 outputs the overflow notification signal. When the watch dog timer 18 receives the WDT clear signal from the CPU 14, it initiates the count value and then restarts the count up from the count value after initialization.

Figure 2:
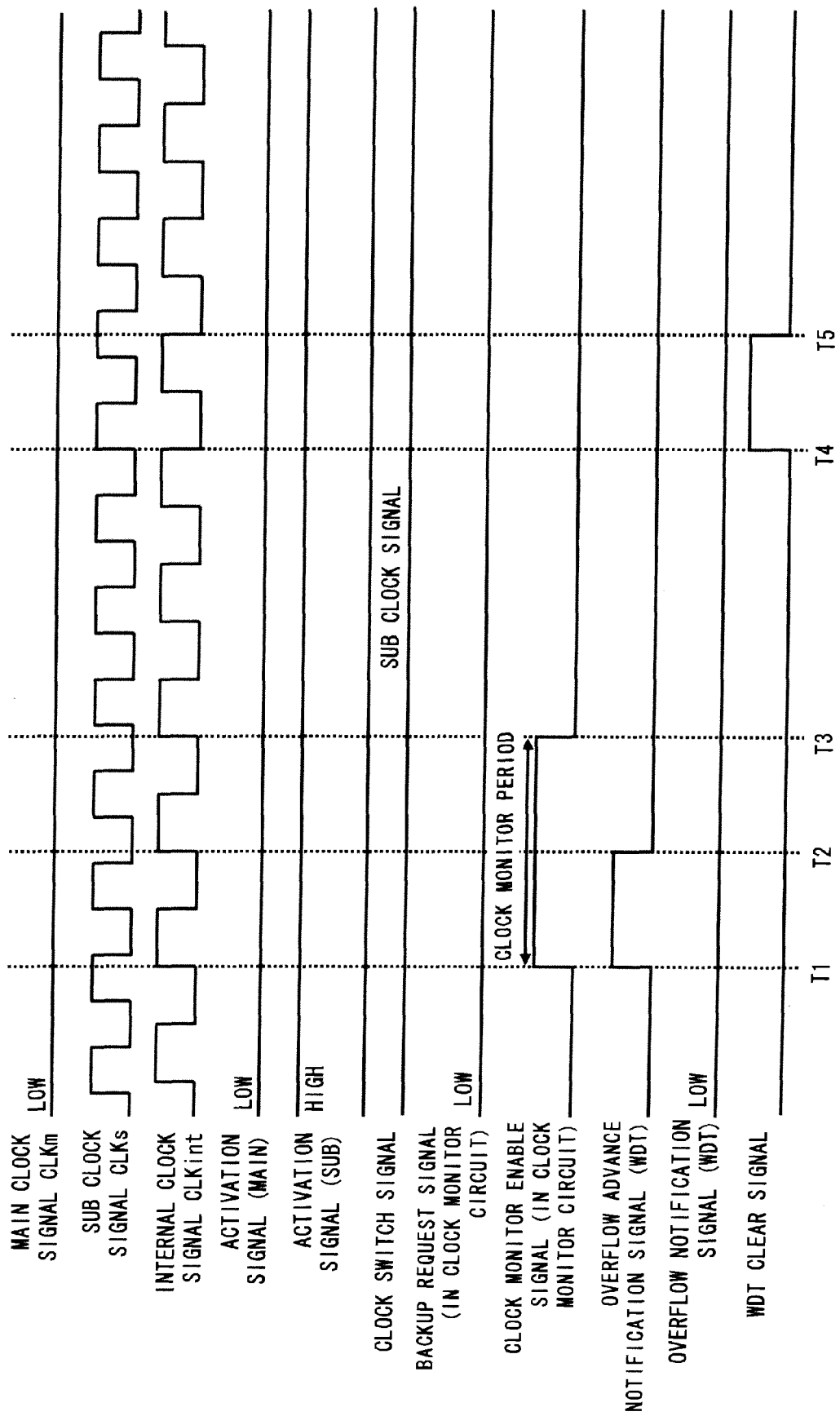
FIG. 2 is a timing chart showing an operation during normal operation in a semiconductor apparatus according to the first exemplary embodiment.
Figure 3:
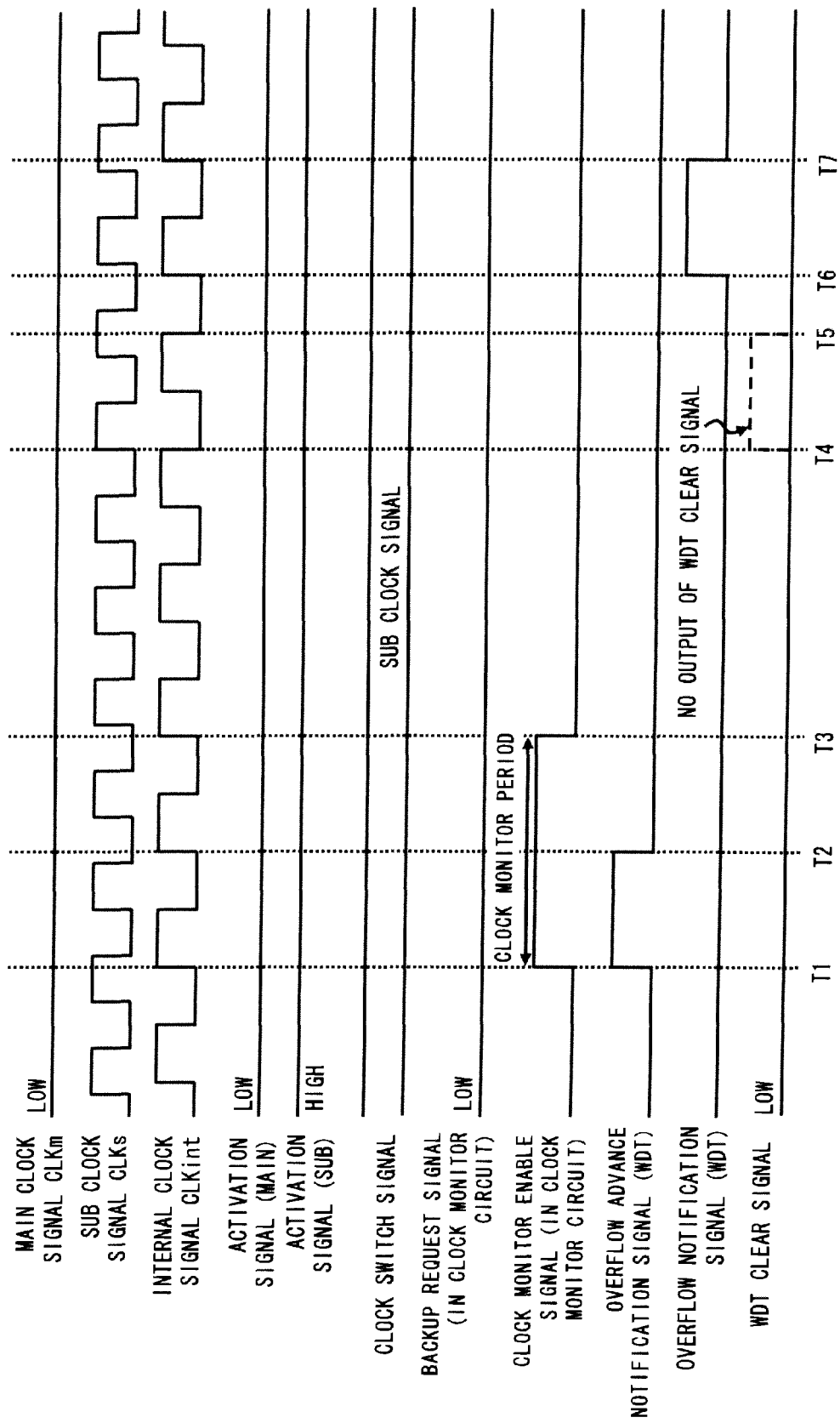
FIG. 3 is a timing chart showing an operation when a program runs away in a semiconductor apparatus according to the first exemplary embodiment.
Figure 4:
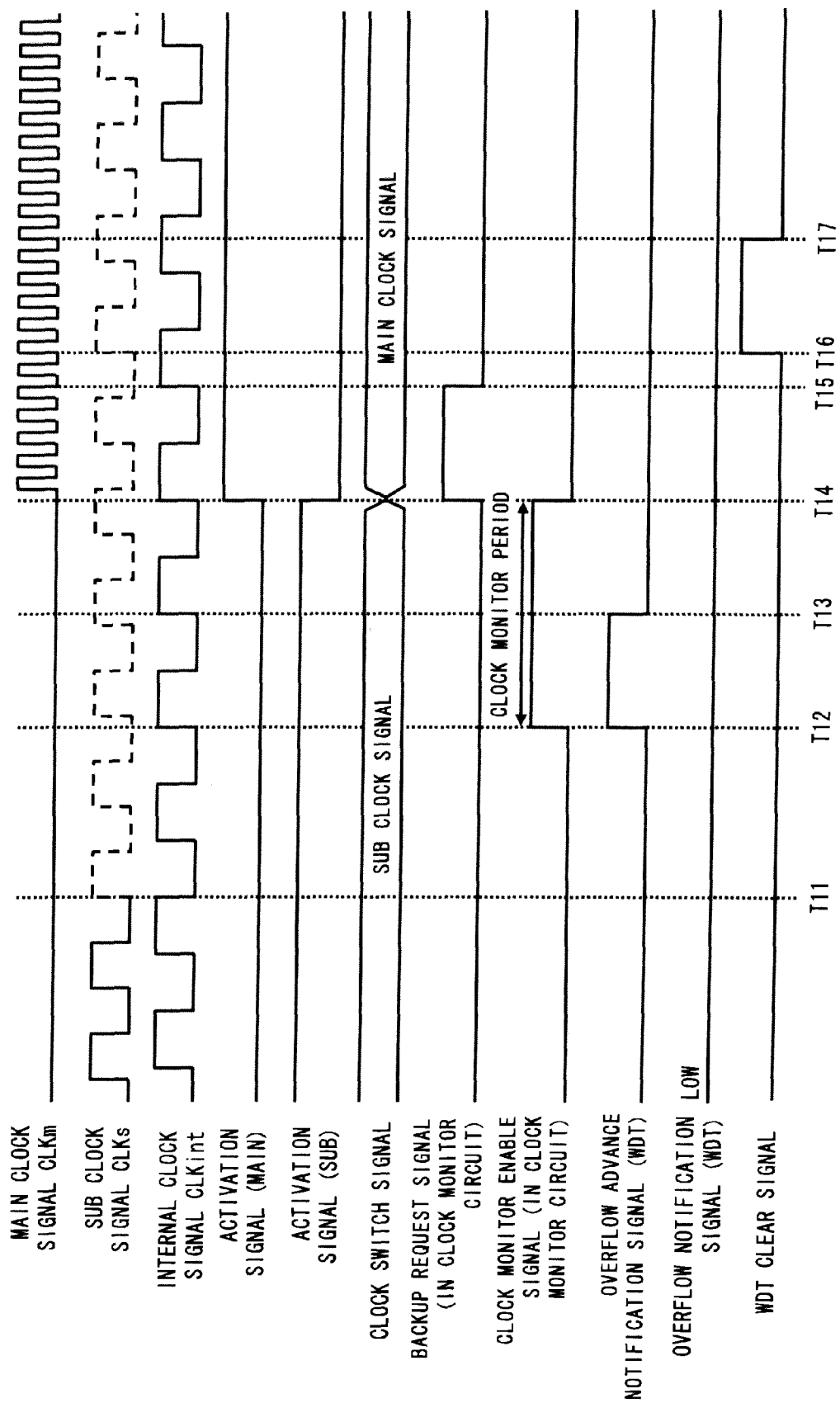
FIG. 4 is a timing chart showing an operation when the stop of an operating clock signal CLKop is detected in a semiconductor apparatus according to the first exemplary embodiment.
Figure 5:
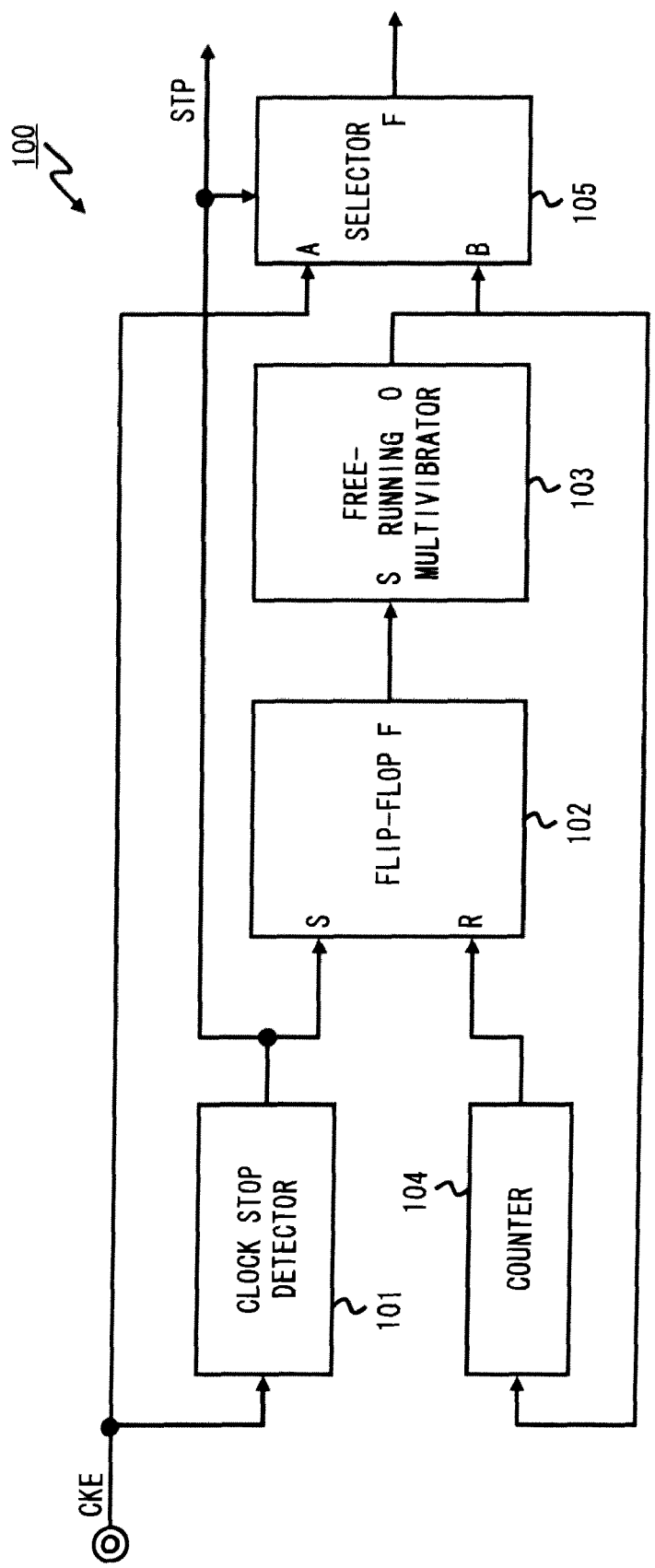
FIG. 5 is a block diagram showing a semiconductor apparatus disclosed in Japanese Unexamined Patent Application Publication No. 4-365110.
Figure 6:
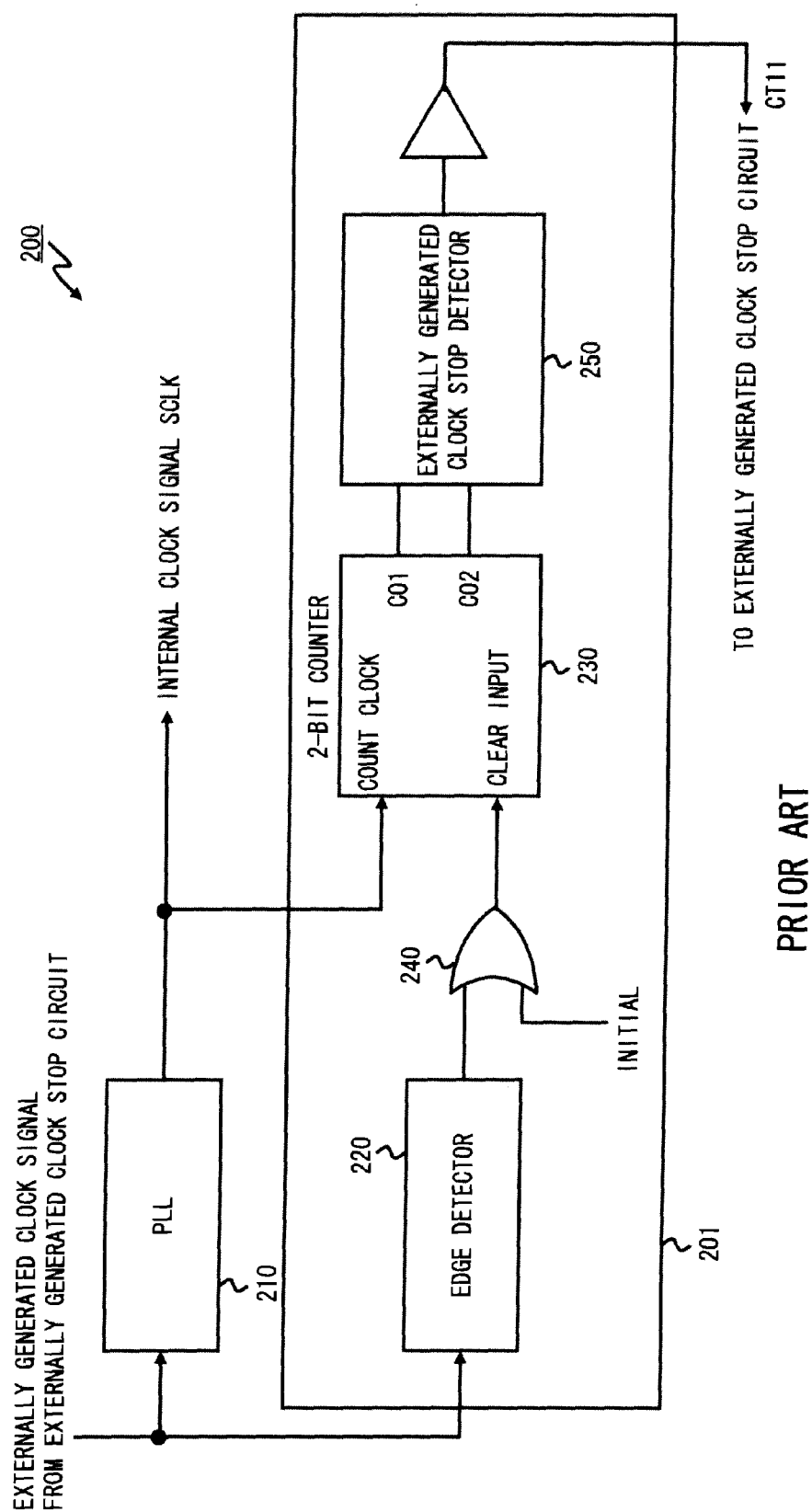
FIG. 6 is a block diagram showing a semiconductor apparatus disclosed in Japanese Unexamined Patent Application Publication No. 2004-334794.

FIGS. 2 to 4 are timing charts showing the operation of the semiconductor apparatus 1. The operation of the semiconductor apparatus 1 is described hereinafter in detail with reference to the timing charts. In the semiconductor apparatus 1, the operation differs depending on the state of a program being executed in the CPU 14 and the state of the operating clock signal CLKop. The timing chart of FIG. 2 shows an example of a case where the operation of a program being executed in the CPU 14 maintains a normal state. The timing chart of FIG. 3 shows an example of a case where an anomaly is occurring in the operation of a program being executed in the CPU 14. The timing chart of FIG. 4 shows an example of a case where an anomaly is occurring in the operation of the CPU 14 due to the stop of the operating clock signal CLKop. In each of the examples of FIGS. 2 to 4, the sub clock signal CLKs is selected as an operating clock signal to be supplied to the CPU 14 as the state at the start of operation.

The example shown in FIG. 2 is described firstly. In this example, the count value of the watch dog timer 18 reaches the advance notification count value at timing T1. Accordingly, the overflow advance notification signal rises at timing T1. At the rising edge of the overflow advance notification signal, a clock monitor enable signal in the clock monitor circuit 17 rises, so that the clock monitor circuit 17 starts monitoring the operating clock signal CLKop. After that, the overflow advance notification signal falls at timing T2. On the other hand, the clock monitor enable signal falls at timing T3 at the end of the clock monitor period. At this time, because the clock monitor circuit 17 detects the presence of the operating clock signal CLKop during the clock monitor period in the example shown in FIG. 2, the clock switch signal, the activation signals and the backup request signal are maintained in the same state. After that, during timing T4 to T5, the CPU 14 outputs the WDT clear signal in response to the overflow advance notification signal that is received at timing T1. The WDT clear signal is output from the CPU 14 when the program being executed in the CPU 14 is normal.

As described above, when there is no anomaly in the program being executed in the CPU 14 and the operating clock signal CLKop is normal, an operation to switch a supply source of the operating clock signal CLKop or the like is not performed in spite of the output of the overflow advance notification signal, and the watch dog timer 18 is reset at appropriate timing. The CPU 14 can thereby continue processing on the program being executed.

The example shown in FIG. 3 is described next. The example of FIG. 3 shows the case where the program being executed encounters an anomaly in the example of FIG. 2. Because the program is in an anomaly state and running away in the example shown in FIG. 3, the WDT clear signal that is supposed to be output during the period of timing T4 to T5 is not output. Thus, the count value of the watch dog timer 18 reaches the maximum count value in timing T6. Then, the watch dog timer 18 outputs the overflow notification signal during the period of timing T6 to T7. The overflow notification signal is input to the CPU 14, and the CPU 14 forcibly terminates the program being executed, thereby stopping the runaway of the program.

As described above, when the program being executed in the CPU 14 runs away in the state where the operating clock signal CLKop is normal, the CPU 14 can get out of the program runaway state by the overflow notification signal that is output, from the watch dog timer 18.

The example shown in FIG. 4 is described below. In the example of FIG. 4, the sub clock signal CLKs that is supplied as the operating clock signal CLKop is stopped at timing T11. After that, the count value of the watch dog timer 18 reaches the advance notification count value at timing T12. Accordingly, the overflow advance notification signal rises at timing T12. At the rising edge of the overflow advance notification signal, the clock monitor enable signal in the clock monitor circuit 17 rises, so that the clock monitor circuit 17 starts monitoring the operating clock signal CLKop. After that, the overflow advance notification signal falls at timing T13. On the other hand, the clock monitor enable signal falls at timing T14 at the end of the clock monitor period. At this time, the clock monitor circuit 17 detects the absence of the operating clock signal CLKop during the clock monitor period in the example shown in FIG. 4. Thus, the clock monitor circuit 17 updates the clock switch signal at timing T14 so as to switch a clock signal to be selected by the selector 13 into the main clock signal. Further, the clock monitor circuit 17 controls the activation signals to terminate the sub oscillator 11 and activate the main oscillator 10. Consequently, the main clock signal CLKm is supplied as the operating clock signal CLKop to the CPU 14, so that the CPU 14 restarts the operation. At the same timing T14, the clock monitor circuit 17 raises the backup request signal to direct the CPU 14 to save the running program. Accordingly, in the operation after the timing T14, the CPU 14 performs the operation to save the program and the processing to terminate the program. The backup request signal falls at timing T15. Then, upon start of the program save operation or the program termination processing, the CPU 14 outputs the WDT clear signal during the period of timing T16 to T17 to clear the count value of the watch dog timer 18.

As described above, in the semiconductor apparatus 1, when the overflow advance notification signal is output due to the stop of the operating clock signal CLKop, the subsequent operation of the CPU 14 is performed by switching a supply source of the operating clock signal CLKop. Further, because the clock signal supplied after switching the operating clock signal CLKop has a different frequency from the original clock signal, a defect in the system can occur due to an error between processing in the CPU 14 and processing in another circuit. In light of this, when restarting the processing in the CPU 14 after the stop of the operating clock signal CLKop in the semiconductor apparatus 1, the program that has been executed is saved and shifted to normal termination. The system reliability in the event that the operating clock signal CLKop is stopped is thereby improved.

As described in the foregoing, in the semiconductor apparatus 1 according to the exemplary embodiment, the watch dog timer 18 detects the possibility that an anomaly is occurring in the program executed in the CPU 14. Then, only when the program anomaly is predicted, the clock monitor circuit 17 to detect the presence or absence of the operating clock signal CLKop is activated. Thus, in the semiconductor apparatus 1 according to the exemplary embodiment, the state of the operating clock signal CLKop is not monitored continuously, thereby reducing the power consumption for monitoring the operating clock signal CLKop. The watch dog timer 18 is the one that has been used to measure the execution time of the program in the CPU 14, and there is no increase in power consumption due to the use of the watch dog timer 18.

Further, in the semiconductor apparatus 1 according to the exemplary embodiment, the watch dog timer 18 detects the possibility that an anomaly is occurring in the program executed in the CPU 14, and the clock monitor circuit 17 checks the presence or absence of the operating clock signal CLKop based on the detection result. If the clock monitor circuit 17 detects the absence of the operating clock signal CLKop, it switches a supply source of the operating clock signal CLKop and outputs the backup request signal so as to direct the CPU 14 to save the program. Consequently, in the semiconductor apparatus 1 according to the exemplary embodiment, a supply source of the operating clock signal CLKop is switched, thereby preventing the forced termination of the program before the supply of the operating clock signal CLKop is restarted. Therefore, it is possible for the semiconductor apparatus 1 according to the exemplary embodiment to prevent the microcomputer from entering a fault state after the restart of the supply of the operating clock signal CLKop, thereby offering high reliability.

Particularly, in the semiconductor apparatus 1 according to the exemplary embodiment, the clock monitor circuit 17 starts monitoring the operating clock signal CLKop based on the overflow advance notification signal, which is output at timing prior to the overflow notification signal that directs the CPU 14 to forcibly terminate the program. Therefore, the semiconductor apparatus 1 according to the exemplary embodiment can ensure that the switching of a supply source of the operating clock signal CLKop and the direction to save the program are performed before the forced termination of the program. Accordingly, because the clock monitor circuit 17 starts monitoring the operating clock signal CLKop based on the overflow advance notification signal, further improvement in reliability is achieved in the semiconductor apparatus 1 according to the exemplary embodiment.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A microprocessor comprising:
   a first oscillator that generates a first clock signal;
   a second oscillator that generates a second clock signal different from the first clock signal;
   a memory that stores a program;
   a Central Processing Unit (CPU) that is responsive to the first clock signal to execute the program; and
   a clock monitor that is responsive to the second clock signal to monitor an oscillation configuration of the first clock signal,
   wherein the clock monitor detects presence or absence of an oscillation of the first clock signal during a first period set based on the second clock signal, and does not detect presence or absence of the oscillation of the first clock signal during a second period other than the first period.

2. The microprocessor according to claim 1, further comprising:
   a Watch Dog Timer (WDT) that counts the second clock signal, and that generates a notification signal indicating that a value of counting the second clock signal reaches a predetermined value,
   wherein the first period is set in response to the notification signal.

3. The microprocessor according to claim 1,
   wherein the clock monitor generates a clock monitor enable signal with a first logic value during the first period, and the clock monitor enable signal with a second logic value during the second period.

4. The microprocessor according to claim 3, further comprising:
   a Watch Dog Timer (WDT) that counts the second clock signal, and that generates a notification signal indicating that a value of counting the second clock signal reaches a predetermined value,
   wherein the clock monitor generates the clock monitor enable signal with the first logic value in response to the notification signal.

5. The microprocessor according to claim 4,
   wherein the clock monitor shifts a logic value of the clock monitor enable signal from the first logic value to the second logic value in a predetermined period after the clock monitor enable signal with the first logic value is generated.

6. The microprocessor according to claim 1, further comprising:
   a selector that receives the first and second clock signal to supply the CPU with the first clock signal,
   wherein the clock monitor generates a clock switch control signal if absence of the oscillation of the first dock signal is detected, and
   wherein the selector switches a clock signal to be supplied to the CPU from the first clock signal to the second clock signal.

7. The microprocessor according to claim 1, further comprising:
   a third oscillator that generates a third clock signal different from the first and second clock signal; and
   a selector that receives the first and third clock signal to supply the CPU with the first clock signal,
   wherein the clock monitor generates a clock switch control signal if absence of the oscillation of the first clock signal is detected, and
   wherein the selector switches a clock signal to be supplied to the CPU from the first clock signal to the third clock signal.

8. The microprocessor according to claim 7,
   wherein the clock monitor generates an activation signal if absence of the oscillation of the first clock signal is detected, and
   wherein the third oscillator is activated in response to the activation signal.

9. The microprocessor according to claim 2,
   wherein the CPU generates a clear signal in response to the notification signal, and
   wherein the WDT resets the value of counting the second clock signal in response to the clear signal.

10. The microprocessor according to claim 4,
    wherein the CPU generates a clear signal in response to the notification signal, and
    wherein the WDT resets the value of counting the second clock signal in response to the clear signal.

11. The microprocessor according to claim 1,
    wherein the clock monitor generates a backup request signal if absence of the oscillation of the first clock signal is detected, and
    wherein the CPU saves information related to the program being executed in response to the backup request signal.

* * * * *